March 28, 1967 W. E. BRENNAN ETAL 3,311,405
VEHICLE SEAT
Filed Aug. 27, 1964 3 Sheets-Sheet 1

INVENTORS
William E. Brennan,
BY Vernon D. Halliday, &
Kennard Pitts
Robert L. Spencer
ATTORNEY INVENTORS
William E. Brennan,
BY Vernon D. Halliday, &
Kennard Pitts
Robert L. Spencer
ATTORNEY

United States Patent Office 3,311,405
Patented Mar. 28, 1967

1

3,311,405
VEHICLE SEAT
William E. Brennan, St. Clair Shores, Vernon D. Halliday, Flushing, and Kennard Pitts, Rochester, Mich., assignors to General Motors Corporation, Detroit, Mich., a corporation of Delaware
Filed Aug. 27, 1964, Ser. No. 392,556
5 Claims. (Cl. 296—66)

This invention relates to vehicle seats and more particularly to a foldable seat arrangement. The seating arrangement embodied in this invention is intended for use in a multi-purpose vehicle body such as commonly found in station wagons. In most station wagons the second seat, disposed rearwardly of the driver's seat, is convertible from an upright seat forming position to a folded floor forming or stored position. In many cases, when the seat is folded to the floor forming position, the seat back is folded over the seat bottom and the back of the seat back provides a level continuation for the cargo carrying floor which is elevated above the primary floor of the vehicle. In some cases, an auxiliary floor panel is positioned between the seat back and the cargo floor to provide a continuous surface between the cargo carrying floor and the seat back.

An object of this invention is to provide a linkage arrangement for moving a seat in a vehicle from a seat forming position to an auxiliary floor forming or stored position.

Another object of this invention is to provide a linkage means for a vehicle seat that automatically anchors the seat to the vehicle floor as the seat moves to seat forming position.

A further object of this invention is to provide locking means for securing an auxiliary floor panel in stored position to the back of the vehicle seat wherein the locking means is responsive to the movement of the seat linkage means to secure the panel in such stored position when not in use.

Another object of this invention is to provide an automatic device for securing a vehicle seat in seat forming position, wherein the locking device is responsive to the position of the seat assembly.

A further object of this invention is to provide in the linkage supporting a seat assembly a first locking means for automatically securing an auxiliary floor panel in stored position and a second locking means for automatically securing the seat assembly in seat forming position, both locking means being responsive to the movement of the seat assembly for automatically locking and unlocking.

These and other objects of this invention will become more apparent as reference is had to the following specification and drawings wherein.

In the description of this invention, sets of parallel links support opposite edges of the seat structure and

2 identical identification numbers will be used to identify the parallelly duplicate but opposite parts.

Figure 4:
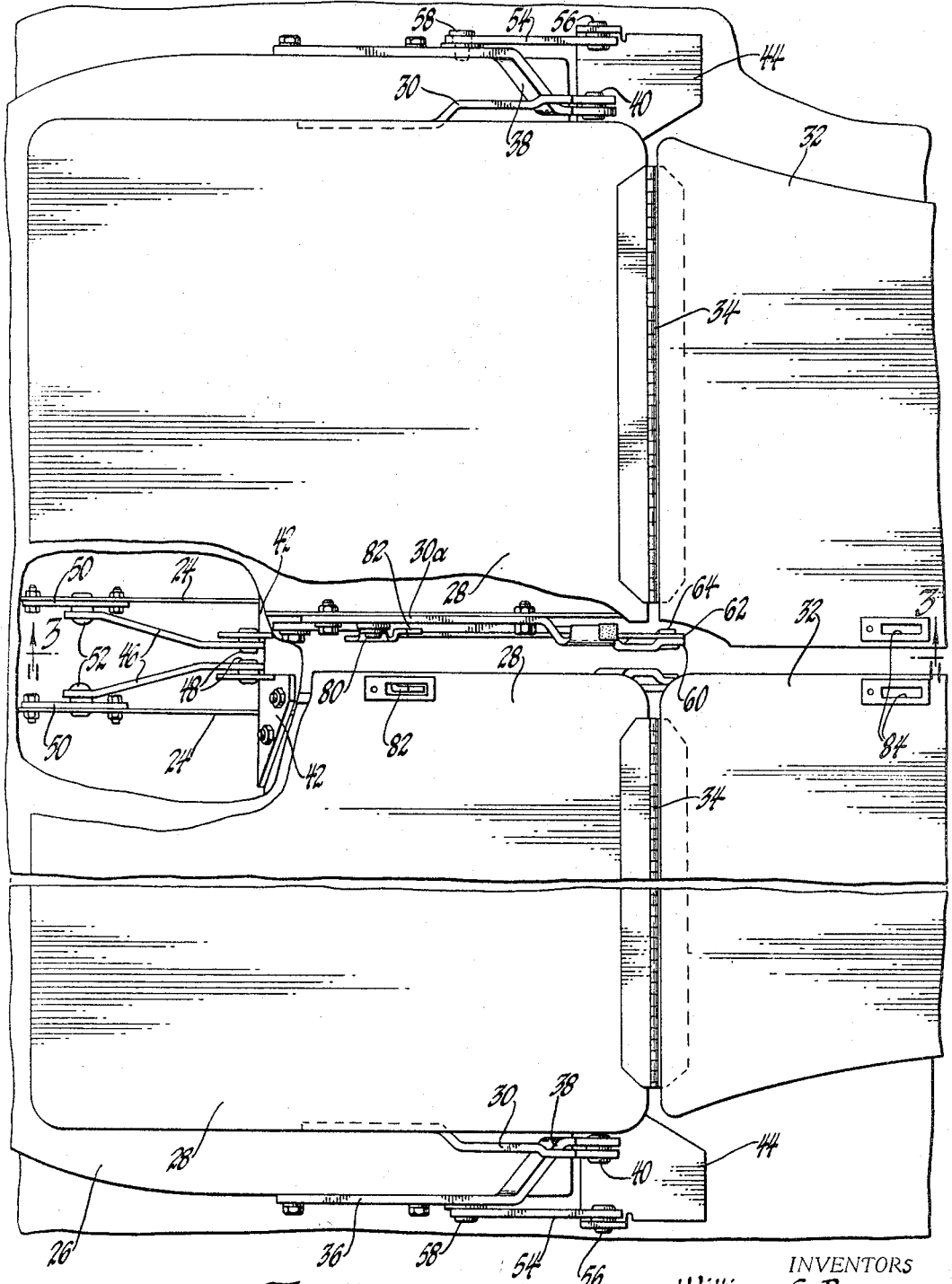
FIGURE 4 is a plan view of the second vehicle seat in the folded position forming the auxiliary floor, with sections cut away for showing the linkages.

Referring to the drawings, the embodiment of this invention illustrated in FIGURE 4, shows a split second seat for a station wagon body wherein both halves of the seat are in folded position. Since the structure for each half is identical but opposite, only the operation and structure of one seat will be described and discussed, it being understood both seats operate in the same manner.

Figure 1:
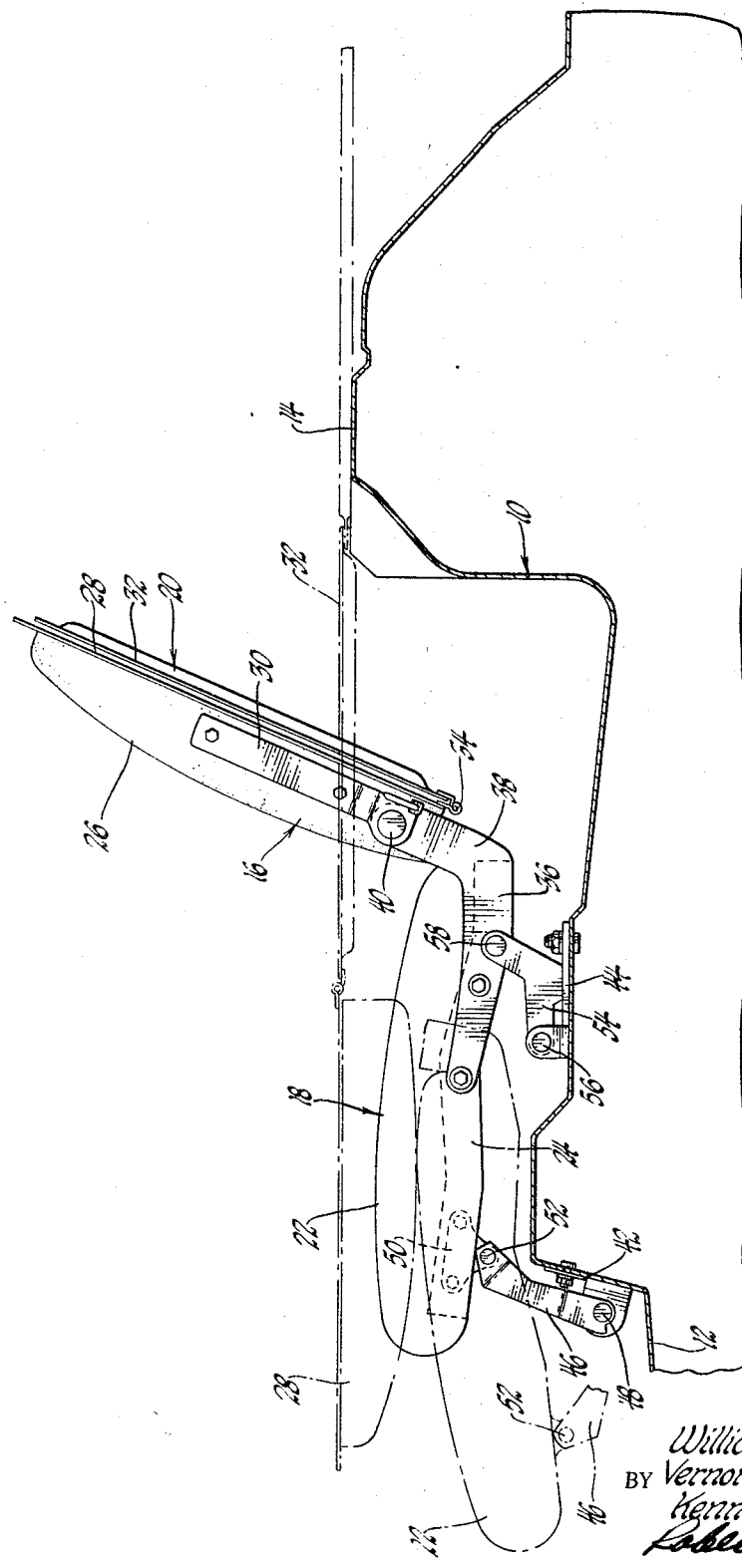
FIGURE 1 is a partial sectional view of a station wagon body with the second seat in a seat forming position and shown in the folded stored position by phantom lines.

As best seen in FIGURE 1, a station wagon body 10 having a primary floor portion 12 and a cargo carrying floor portion 14 positioned above and to the rear of the primary floor portion, a foldable forward facing vehicle seating assembly, indicated generally by the numeral 16, is mounted on the primary floor portion forwardly of the cargo carrying portion. The seating assembly 16 includes a seat unit 18 and a seat back unit 20. The seat unit 18 includes a seat cushion 22 mounted on a seat frame 24. The seat back unit 20 has a seat back cushion 26 on one side and an auxiliary floor portion 28 on the other side, the cushion 26 and floor portion 28 being assembled on a seat back frame 30. An auxiliary floor panel 32 is attached to one edge of floor portion 28 by a hinge 34. A support arm 36 is rigidly secured to the seat frame 24 by bolts or other suitable means and has a portion 38 extending upwardly at the rear of the seat cushion 22 for being pivotally secured to the seat back frame 30 by a rivet or pivot pin 40 thereby pivotally joining the seat unit 18 and seat back unit 20.

Anchor plates 42, 44 are secured to the primary floor portion 12 by bolts or other suitable means and are adapted to pivotally support the seating assembly 16 in the body. A front link 46 has one end pivotally secured to the front anchor plate 42 by a rivet or pivot pin 48. The other end of front link 46 is pivotally secured to a front support bracket 50 by a rivet or pivot pin 52. The front support bracket 50 is secured to the seat frame 24 by rivets or other suitable means. A rear support link 54 has one end pivotally secured to the rear anchor plate 44 by a rivet or pivot pin 56 and the other end is secured to support arm 36 by a rivet or pivot pin 58. The linkage thus far described provides a common linkage type of support whereby the seat back unit 20 may be folded forwardly over the seat unit 18 by pivoting at pivot pin 40 and the entire structure may be pivoted forwardly and downwardly to the position shown in phantom lines of FIGURE 1 by the forward pivoting of links 46–54 about their pivot points 48, 56, respectively, while the seat assembly 16 and links pivot at pivot points 52 and 58, respectively.

Figure 2:
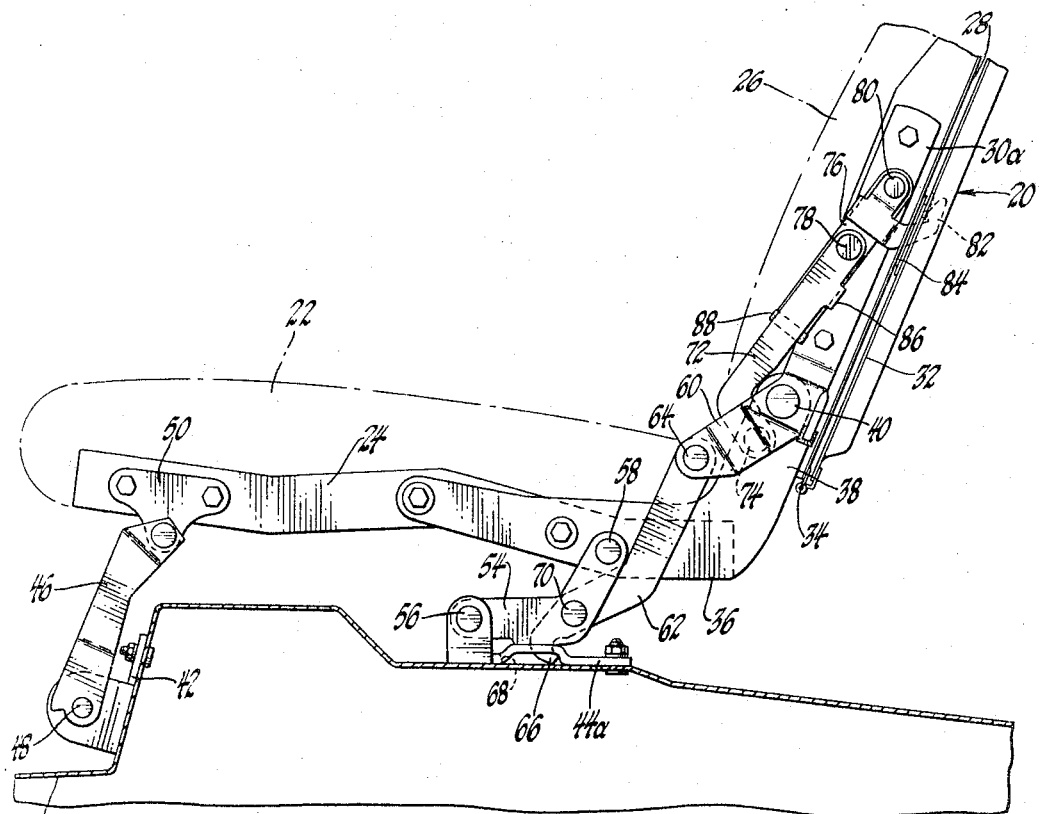
FIGURE 2 is an enlarged sectional view of the inner linkage means for a second vehicle seat in the seat forming position with the seat cushions shown in phantom lines and portions broken away.
Figure 3:
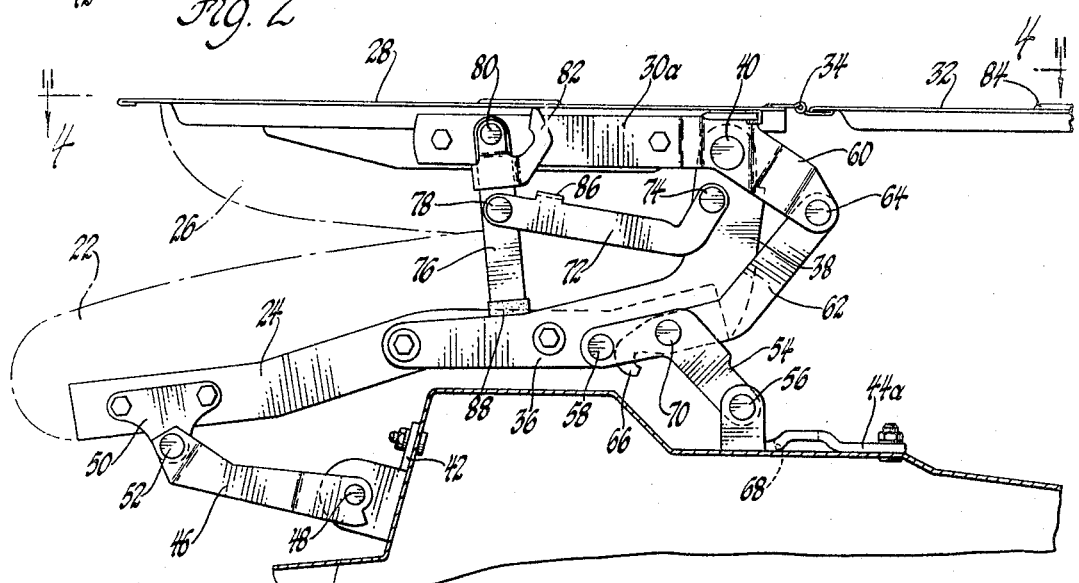
FIGURE 3 is a view taken in the direction of the arrows 3—3 of FIGURE 4 showing the seat linkage in the folded or stored position and the auxiliary filler panel extended for forming the secondary or auxiliary floor.

Referring now to FIGURES 2 and 3, the novel inner linkage of the seat structure is best illustrated. A series of links responsive to the position of the rear seat support link 54 and the seat frames 24 and 30a react to secure the seat assembly and to secure the auxiliary floor panel 32 in stored position adjacent the auxiliary floor portion 28 of the seat back unit.

Two parts of the inner linkage and support structure are modified when compared with the outer linkage structure. The modified seat back frame 30a has an arm 60 which extends forwardly and downwardly when the seat assembly is in seat forming position. A catch link 62 has one end pivotally connected to the arm 60 by a rivet or pivot pin 64. The other end of catch link 62 is formed in the shape of a hook 66 which coacts with a aperture 68 in the modified rear anchor plate 44a. The catch link 62 is pivotally connected intermediate its ends to the rear support link 54 by a rivet or pivot pin 70 whereby the rear support link is secured from movement (from the seat forming position) when the catch link is engaged with the rear anchor plate. When the hook 66 is engaged with aperture 68 further rearward movement of the seat back is also prevented.

An inner stop link 72 has one end pivotally connected to the end portion 38 of seat frame 24 by a rivet or pivot pin 74 and the other end pivotally connected to a locking link 76 by a rivet or pivot pin 78. The one end of the locking link 76 is pivotally connected to the seat frame 30a by a rivet or pivot pin 80. The locking link 76 has a locking hook 82 which coacts with a locking aperture 84 formed in the auxiliary floor panel 32 for securing the floor panel in stored position adjacent the auxiliary floor portion 28 of the seat back unit. The other end 88 of locking link 76 contacts support arm 36 when the seat assembly is in the folded position. A tab 86 extends at a right angle from link 72 in the path of link 76 for limiting the movement of link 76 about pivot link 80 toward auxiliary floor panel 32.

In operation, beginning with the seat assembly in the seat forming position as shown in solid lines of FIGURES 1 and 2, the seat assembly 16 is maintained in the seat forming position by the coaction of the hook 66 of the catch link 62 coacting with anchor plate 44a and preventing rotation of the seat back clockwise about pivot pin 40, and the over center position of pivot pin 64 which pivotally joins catch link 62 and seat back frame 30 and prevents counterclockwise rotation of the seat back about pivot pin 40. Should a more positive means be required to prevent the seat back from moving forwardly in a counterclockwise direction about pivot pin 40 any of a number of commonly known locking means could be utilized by one skilled in the art. Forward movement of links 46, 54 is prevented by the engagement of hook 66 with anchor plate 44a which secures link 54 in seat forming position.

To move the seat assembly from the seat forming position shown in FIGURES 1 and 2 to the folded or cargo carrying position shown in FIGURES 3 and 4, the seat back unit 20 is pivoted counterclockwise about pivot pin 40. Such pivotal movement of seat back unit 20 moves the pivot pin 64 counterclockwise about the pivot pin 40 causing catch link 62 to rotate about the pivot pin 70 thereby removing hook 66 from engagement with aperture 68 thus freeing rear support link 54 for counterclockwise rotation about pin 56. With support link 54 free for rotation, the front support link 46 and rear support link 54 rotate counterclockwise about their pivot pins 48, 56, respectively, to the position shown in FIGURES 3 and 4. As the seat unit moves from seat forming position to the folded or stored position, the seat back continues to rotate counterclockwise about pivot pin 40 to the folded or stored position shown in FIGURES 3 and 4. The further rotation of the seat back unit about pivot pin 40 causes the inner stop link 72 to pivot counterclockwise about pivot pin 74. Such rotation of the inner stop link causes the locking link 76 to rotate clockwise about pivot pin 80 through the movement of pivot pin 78 by inner stop links 72. As the locking link 76 rotates clockwise about pivot pin 80, locking hook 82 disengages from aperture 84 of the auxiliary seat back panel freeing it for movement. With the seat assembly in the folded position, the auxiliary floor panel may be unfolded, placed in position between the seat assembly and the cargo floor thereby providing a continuous loading platform consisting of the cargo floor, auxiliary floor panel and auxiliary floor portion of the seat back. As can be seen best in FIGURE 3, the end 88 of locking link 76 contacts support arm 36 thereby assisting the cushions in supporting any load placed upon the auxiliary floor portion of the seat back. To return the folded seat assembly to the seat forming position, the auxiliary floor panel is folded back to its position parallelly adjacent the auxiliary floor portion of the seat back unit. Then the seat back unit is rotated rearwardly about pivot pin 40 and such movement rotates the entire seat assembly to the seat forming position as shown in FIGURES 1 and 2.

While the preferred embodiments of the present invention have been shown and described herein it is obvious that many structural changes may be made without departing from the spirit and scope of he following claims.

We claim:

1. In a vehicle body having a primary floor and a cargo floor, a convertible seat assembly including a seat and a seat back, said seat assembly having a seat forming position and a folded stored position and being movable therebetween, anchor plates secured to said body, linkage means pivotally secured to said anchor plates and to said seat assembly for supporting said seat assembly, an auxiliary floor panel pivotally secured to one edge of said seat back, said linkage means including a first hook lever and a second hook lever, said first hook lever coacting with one of said anchor plates for limiting pivotal movement of said seat assembly in one direction, said linkage means having an over center position for resisting pivotal movement of said seat assembly in the other direction, and said second hook lever engaging an aperture in said auxiliary floor panel for securing said panel parallelly adjacent said seat back when said seat assembly is in said seat forming position and during movement to said stored position, said second hook lever releasing said panel when said seat assembly is in said stored position.

2. In a vehicle body having a primary floor and a cargo floor, a convertible seat assembly including a seat and a seat back, said seat assembly having a seat forming position and a folded stored position and being movable therebetween, anchor plates secured to said body, linkage means pivotally secured to said anchor plates and to said seat assembly for supporting said seat assembly, an auxiliary floor panel pivotally secured to one edge of said seat back, said linkage means including a first hook lever and a second hook lever, said first hook lever coacting with one of said anchor plates for limiting pivotal movement of said seat assembly in one direction, and said second hook lever engaging an aperture in said auxiliary floor panel for securing said panel parallelly adjacent said seat back when said seat assembly is in said seat forming position and during movement to said stored position, said second hook lever releasing said panel when said seat assembly is in said stored position.

3. In a vehicle body having a floor, a convertible seat pivotally secured to said floor, said seat having an upright seat forming position and a folded stored position and being movable therebetween, anchoring means secured to said vehicle body, linkage means pivotally interconnecting said anchoring means and said seat for supporting said seat and for moving said seat between said seat forming position and said stored position, said linkage means having a hook means coacting with said anchoring means for limiting pivotal movement of said seat in one direction, engagement of said hook means with said anchoring means being responsive to the position of said seat.

4. In a vehicle body having a floor, a convertible seat pivotally secured to said floor, said seat having an upright seat forming position and a folded stored position and being movable therebetween, anchoring means secured to said vehicle body, linkage means pivotally interconnecting said anchoring means and said seat for supporting said seat and for moving said seat between said seat forming position and said stored position, said linkage means having a hook coacting with said anchoring means for limiting pivotal movement of said seat in one direction, said hook being effective to automatically engage said anchoring means when said seat moves into said seat forming position.

5. In a vehicle body having a primary floor and a cargo floor, a convertible seat assembly including a seat unit and a seat back unit, said seat assembly having a seat forming position and a stored position and being movable therebetween, linkage means pivotally secured to said primary floor and to said seat assembly for supporting said seat assembly and for moving said seat assembly between said positions, said seat back unit having a cushioned side, an auxiliary floor portion, an auxiliary floor panel and a hinge for connecting said auxiliary floor panel in a folded position adjacent said auxiliary floor portion for movement to an extended position, said auxiliary floor panel having a locking aperture therein, said linkage means including a hook lever responsive to movement of said seat assembly for movement between locked and unlocked positions, said hook lever being in unlocked position when said seat assembly is in said stored position and automatically moving to locked position when said seat assembly is moved from said stored position, said locking aperture engaging said hook lever when said hook lever moves to locked position for securing said auxiliary floor panel adjacent said auxiliary floor portion, said auxiliary floor panel being hingedly movable from folded position to extended position when said seat assembly is in stored position for coacting with said auxiliary floor portion and said cargo floor whereby an extended cargo carrying platform is formed.

References Cited by the Examiner

UNITED STATES PATENTS

| | | | |
|---|---|---|---|
| 2,546,834 | 3/1951 | Pfau | 297—64 |
| 2,926,950 | 3/1960 | Hooverson | 296—66 |
| 2,949,331 | 8/1960 | Himka | 296—66 |

BENJAMIN HERSH, *Primary Examiner.*

J. H. BRANNEN, *Assistant Examiner.*